Figure 1:
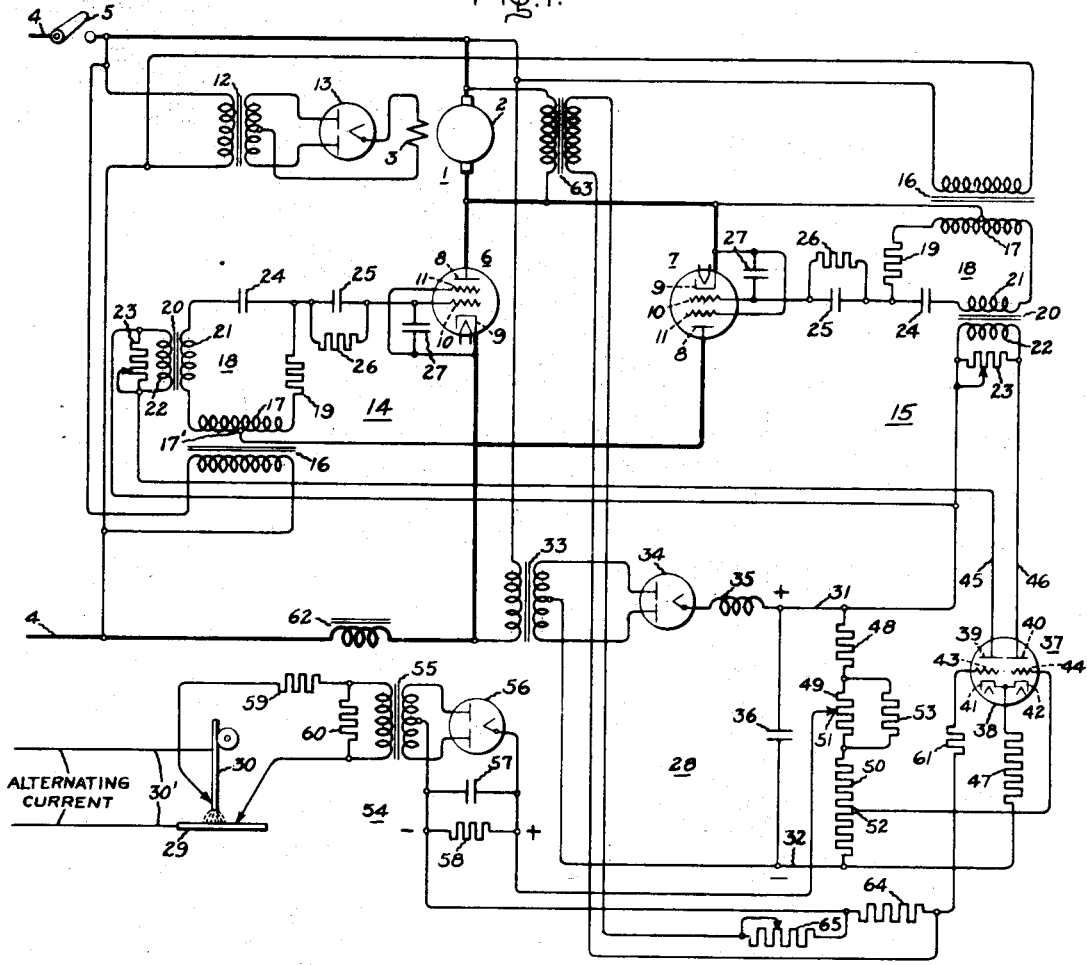

Oct. 3, 1939.  J. E. ANDERSON  2,175,009

ELECTRIC CONTROL CIRCUIT

Filed March 5, 1938  2 Sheets-Sheet 1

Inventor:
Jasper E. Anderson,
by Harry C. Dunham
His Attorney.

Oct. 3, 1939.  J. E. ANDERSON  2,175,009
ELECTRIC CONTROL CIRCUIT
Filed March 5, 1938  2 Sheets-Sheet 2

Inventor:
Jasper E. Anderson,
by Harry E Dunham
His Attorney.

Patented Oct. 3, 1939

2,175,009

UNITED STATES PATENT OFFICE 2,175,009

ELECTRIC CONTROL CIRCUIT

Jasper E. Anderson, Scotia, N. Y., assignor to General Electric Company, a corporation of New York Application March 5, 1938, Serial No. 194,158

18 Claims. (Cl. 172—239)

My invention relates to electric control circuits and more particularly to electric control circuits employing electric valve means.

Although not particularly limited thereto, my invention relates to certain improvements in electric circuits of the type disclosed and claimed in a copending patent application Serial No. 155,509 of William D. Cockrell, filed July 24, 1937, and assigned to the assignee of the present application.

In the application of electric valve systems to the control of dynamo-electric machines, it is frequently desirable to employ anti-hunting arrangements to afford a stabilizing action and to prevent thereby overshooting of the controlling or compensating action. For example, in the arrangements intended for control of the speed of direct current machines it has been found important to stabilize the action of the controlling systems by the provision of separate means to maintain the electrical characteristics or operating conditions of the machine within narrowly defined limits without sacrificing the precision of control and speed of response necessary to satisfy the requirements of various commercial applications. For example, in electric arc welding systems in which electric motors are employed to feed a welding electrode to the work, it has been found desirable not only to control the rate at which the electrode is fed to the work but also to provide additional means to maintain the arc voltage at a substantially constant value or within a predetermined narrowly defined range of values. Furthermore, it is advantageous to provide control systems in which there is a definite limit to the maximum speed at which the control motor effects movement of the electrode to or from the work. In addition, it is important to provide anti-hunting apparatus to control or delay the rate of change of the control potential in order to eliminate or reduce, as much as possible, the hunting action which may be caused by the control system. It has also been found that in systems of this nature it is important to effect a substantially instantaneous movement of the electrode away from the work when the arc voltage reaches a predetermined minimum value and to move the electrode towards the work at an appreciably slower rate when the arc voltage exceeds a predetermined maximum value. A still further feature which is desirable in systems of this nature is the provision of means by virtue of which the anti-hunting action may be different for different directions of movement of the welding electrode.

It is an object of my invention to provide a new and improved electric control system.

It is another object of my invention to provide a new and improved electric valve control system for dynamo-electric machines.

It is a further object of my invention to provide a new and improved anti-hunting system for electric valve control systems.

In accordance with the illustrated embodiments of my invention, I provide a new and improved stabilizing circuit or anti-hunting arrangement for electric valve circuits which may be employed to control electrical characteristics or operating conditions of dynamo-electric machines. Where the invention is applied to the control of the speed and direction of rotation of a dynamo-electric machine of the direct current type, a pair of reversely connected electric valve means is connected in series relation with the armature circuit of the machine to supply current thereto from an associated alternating current supply circuit. Excitation circuits are associated with the electric valve means and impress alternating voltages which are variable in phase on the associated control members to control the conductivities of the electric valves so that the speed and the direction of rotation of the machine are controllable. The excitation circuits are selectively energized by means of the control circuit disclosed and claimed in the above-identified application of William D. Cockrell and includes an electric discharge means having a pair of discharge paths each provided with a control member. The potential impressed on one of the control members is substantially constant, whereas the potential impressed on the other control member varies in accordance with a predetermined controlling influence, such as the arc voltage in a welding circuit. As an agency for stabilizing the action of the regulating system and as a means for preventing hunting to obtain the desired precise control, I provide a circuit or circuits which are responsive to the rate of change of the voltage appearing across the armature winding of the direct current machine. This transient voltage is introduced into the control circuit for the electric discharge device and acts as a stabilizing influence to control or delay the rate of change of potential of the control members. This action effects a smooth control and avoids an overshooting of the condition or characteristic which is to be regulated.

In accordance with one of the embodiments of my invention, I provide a pair of electric circuits which are responsive to the polarity of the voltage appearing across the armature winding of the direct current machine and which introduce stability or anti-hunting influences into the control circuit for the electric discharge device. Each of these circuits includes a unidirectional conducting device and transmits unidirectional current to an impedance element which is connected in the control circuit. Circuit controlling means, such as adjustable resistances, are connected in series relation with the unidirectional conducting devices to control the magnitudes of the currents transmitted thereby, so that different anti-hunting actions are obtainable for different changes or different directions of change in the energization of the direct current machine.

In a further embodiment of my invention diagrammatically illustrated, current responsive means are connected in series relation with each of the reversely connected electric valve means to produce anti-hunting action. Current transformers may be employed for this purpose and may be used to introduce stabilizing voltages into the excitation circuits for the electric valve means. These anti-hunting circuits may be arranged to be independently adjusted so that the anti-hunting actions are different for different directions of change in the energization of the direct current machine.

Figure 2:
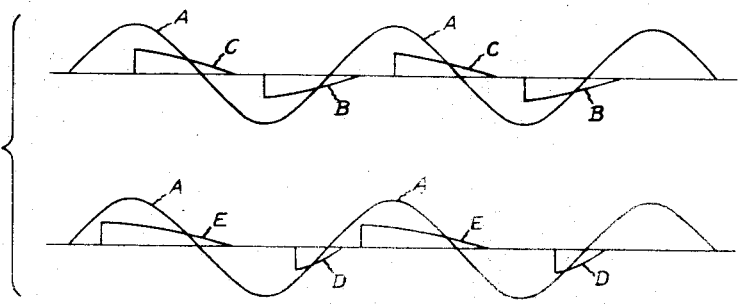
Figure 3:
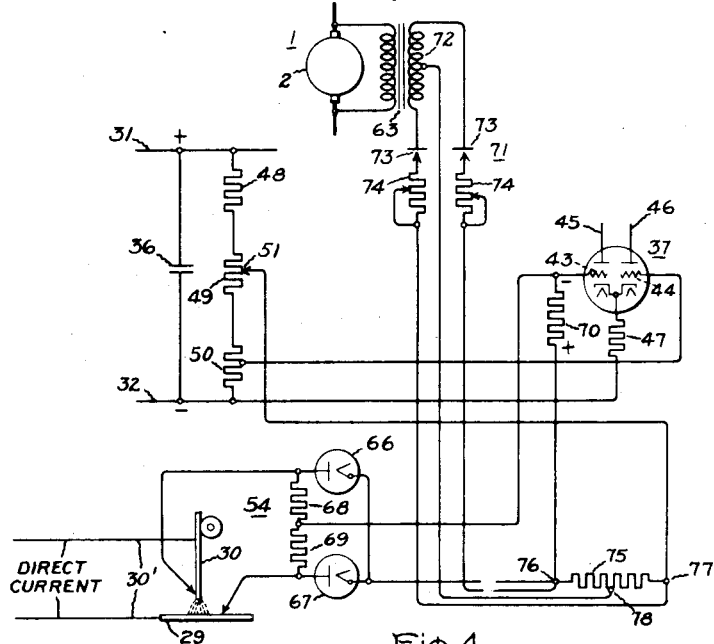
Figure 4:
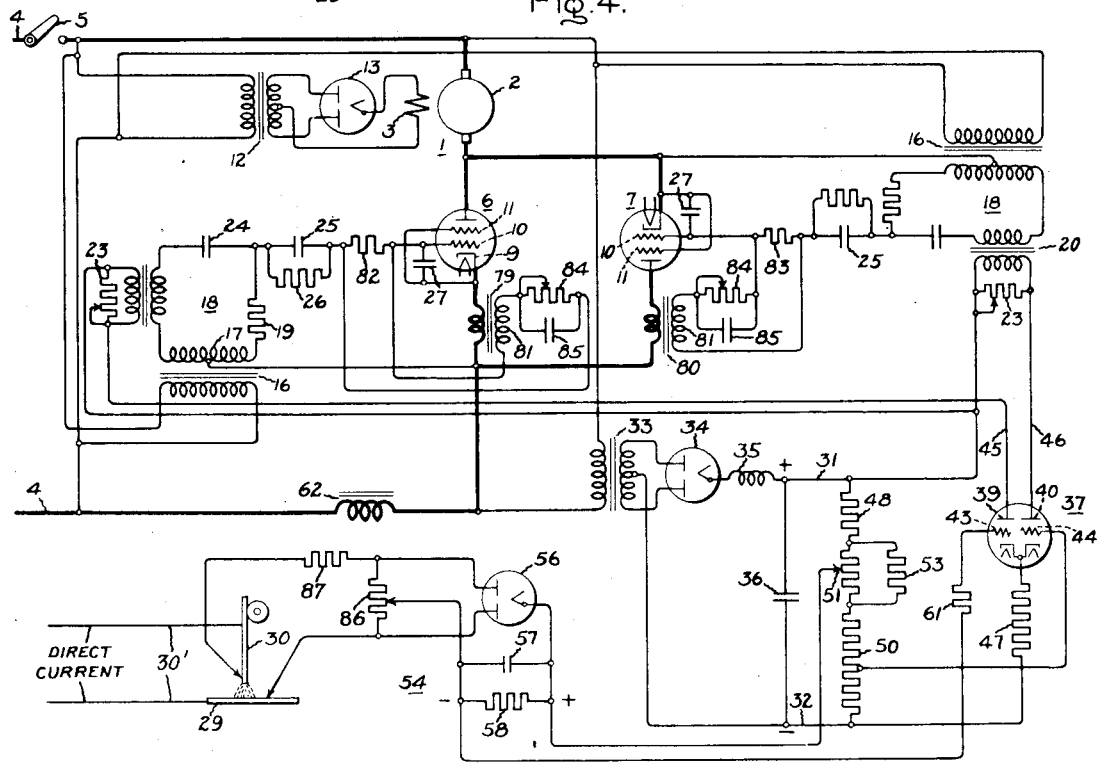

Fig. 1 of the accompanying drawings diagrammatically illustrates an embodiment of my invention as applied to an electric valve control system of the type disclosed and claimed in the above identified application of William D. Cockrell; and Fig. 2 represents certain operating characteristics thereof. Fig. 3 represents another embodiment of my invention in which the anti-hunting action is responsive to the direction of change of energization of a direct current motor. Fig. 4 illustrates a further embodiment of my invention in which individual anti-hunting means are associated with each of a pair of reversely connected electric valve means which energize a direct current motor.

In Fig. 1 of the accompanying drawings my invention is diagrammatically illustrated as applied to an electric valve control system for energizing a translating device such as a dynamo-electric machine or motor 1 of the direct current type, having an armature member 2 and a field winding 3, from an alternating current circuit 4. The motor 1, of course, constitutes the load circuit which is controlled. A suitable circuit controlling means, such as a switch 5, may be provided to connect and disconnect the motor 1 from the alternating current circuit 4. In order to control the direction of rotation of the armature 2 of machine 1 and to control the speed of rotation of the armature 2, I provide a pair of oppositely disposed electric valve means 6 and 7, preferably of the type employing an ionizable medium such as a gas or a vapor, and each including an anode 8, a cathode 9 and a control member 10. The electric valve means 6 and 7 may also be provided with an additional control member 11 which may be connected to the cathode 9 or to a potential less positive than that of the anode 8. The electric valve means 6 and 7 are connected reversely in parallel to conduct current in opposite directions through armature member 2 of machine 1.

To energize field winding 3 of dynamo-electric machine 1 I may employ any suitable source of direct current, and in the arrangement shown in Fig. 1 I have chosen to illustrate this source as comprising a transformer 12 connected to circuit 4 and a suitable full wave rectifier 13. It is to be understood that I may employ other suitable arrangements for supplying direct current to the field winding 3.

I employ excitation circuits 14 and 15 associated with electric valve means 6 and 7, respectively, to impress alternating voltages which are variable in phase on control members 10 thereof to control the conductivities of these electric valve means. The excitation circuits 14 and 15 are similar in construction and arangement and, for the purpose of description, excitation circuit 14 will be considered in particular. Excitation circuit 14 includes a transformer 16 energized from circuit 4, and provided with a secondary winding 17 having an electrical neutral connection 17' which is connected to cathode 9 of electric valve 6. Transformer 16 serves to provide an alternating voltage for energizing excitation circuit 14. The output of the winding 17 is connected to a phase shifting circuit 18 comprising a resistance 19 and a variable inductive element 20 which may be saturable and which may comprise a winding 21 of variable inductance and a control winding 22 which may control the saturation of the element 20 and hence control the inductance of winding 21. A resistance 23 may be connected across the terminals of control winding 22, and, if desired, a capacitance 24 may be connected in series relation with the inductive winding 21 to provide additional phase displacement of the alternating voltage impressed on control member 10. The resistance 23 may be made adjustable so that the maximum speed of the motor 1 in each direction may be independently controllable. A parallel connected capacitance 25 and a resistance 26 are connected in series relation with the control member 10 of electric valve 6 and the phase shifting circuit 18 and serve as a self-biasing means to impress on control member 10 a negative unidirectional biasing potential. A capacitance 27 may be connected across control member 10 and cathode 9 of electric valve 6 to absorb extraneous transient voltages which may be present in the excitation circuit 14.

As an agency for controlling the excitation circuits 14 and 15 and for controlling the currents conducted by electric valve means 6 and 7 in accordance with a predetermined controlling influence variable in accordance with an electrical or operating condition of the dynamo-electric machine 1, I provide a voltage sensitive circuit 28. In the particular arrangement shown in Fig. 1, the controlling influence is the arc voltage between a work member 29 and a welding electrode 30. The welding current may be supplied by conductors 30' which are connected to the welding electrode and the work 29. The electrode 30 is actuated by the dynamo-electric machine 1 through mechanism not shown, and the rate at which the electrode 30 is fed to the work 29 is dependent upon the speed of the dynamo-electric machine 1. Furthermore, since the dynamo-electric machine 1 is reversible, the arc length is controllable in accordance with the arc voltage. The voltage sensitive circuit 28 includes a source of direct current comprising conductors 31 and 32 which are energized from any suitable source such as a transformer 33 which is energized from the alternating current circuit 4 and a suitable full wave rectifier 34. A smoothing reactor 35 may be connected in series relation with the rectifier 34, and a capacitance 36 may be connected across the conductors 31 and 32 to maintain the voltage appearing across these conductors at a substantially constant value.

An electric valve means 37, preferably of the high vacuum type, is included in the voltage sensitive circuit 28 and comprises an envelope 38 and a pair of electric discharge paths including anodes 39 and 40, cathodes 41 and 42 and control members or grids 43 and 44. Although the electric valve means 37 is shown as being of the type in which both electric discharge paths are enclosed within the same envelope, it is to be understood that I may employ a pair of electric discharge paths each mounted within a separate envelope, and that the cathodes thereof may be connected together. The cathodes 41 and 42 are connected together and the anodes 39 and 40 are connected to a pair of circuits including conductors 45 and 46, respectively. Conductor 45 transmits unidirectional current to control winding 22 of the saturable inductive device 20 in excitation circuit 14, and conductor 46 transmits unidirectional current to control winding 22 of the saturable inductive device 20 in excitation circuit 15. A suitable impedance member such as a resistance 47 is connected to the cathodes 41 and 42 and in series relation with both of the electric discharge paths of electric valve means 37 and serves to control the potential of the cathodes in accordance with the sum of the currents conducted by the discharge paths. A voltage divider, including serially connected resistances 48, 49 and 50, is connected across the direct current source including conductors 31 and 32. The resistance 49 is provided with an adjustable contact or tap 51 and the resistance 50 is provided with a tap 52 which is connected to control member 44 of electric valve means 37. The potential impressed on control member 44 is one of substantially constant value. A suitable resistance 53 may be connected across the resistance 49 if desired to afford a finer adjustment.

To impress on control member 43 a potential which varies in accordance with a predetermined controlling influence, such as the voltage appearing between the electrode 30 and the work 29, I use a circuit 54 including a transformer 55, a full wave rectifier 56, a capacitance 57 connected in parallel across the output circuit of the rectifier 56, and a resistance 58. A current limiting resistance 59 may be connected in series relation with the primary winding of transformer 55 and a resistance 60 may be connected in parallel relation therewith. Of course, the particular voltage responsive circuit 54 shown in Fig. 1 is intended for use in those applications where the welding current is alternating. The voltage appearing across the terminals of resistance 58, due to the conduction of unidirectional current therethrough, will vary in accordance with the arc voltage, and the voltage appearing across resistance 58 is combined with an opposing component of unidirectional voltage derived from a portion of the voltage divider including a part of resistance 49 and resistance 50. A suitable current limiting resistance 61 may be connected in series relation with the control member 43 of electric valve 37. The tap 51 is preferably adjusted so that when the arc voltage is at its predetermined desired value, the voltage provided by the resistance 58 is slightly greater than the voltage provided by the lower portion of the voltage divider. Since the voltage appearing across the terminals of resistance 58 opposes that obtained from the lower portion of the voltage divider, the net potential impressed on control member 43 will be negative relative to the potential of cathode 41.

While I have chosen to represent the voltage sensitive circuit 28 as being responsive to the arc voltage appearing between the electrode 30 and the work 29, it is to be understood that my invention in its broader aspects may be applied to a control system in which any other controlling influence is employed.

I connect a self-saturating inductive reactance 62 in series relation with the electric valve means 6 and 7 and armature 2 of machine 1 to serve as a protective device to limit the current when the machine 1 is at standstill. Under this condition, electric valves 6 and 7 conduct opposing currents for equal fractions of a cycle and the reactance 62 will be unsaturated and the impedance thereof will be greater than when electric valves 6 and 7 conduct for different fractions of a cycle. Under the latter condition, the preponderance of current flow in one direction effects saturation of the reactance 62 and, of course, reduces the impedance thereof. In this manner, I use a protective arrangement to limit the current through armature 2 during standstill and which decreases in impedance when the machine rotates, thereby avoiding material voltage drop through the reactance 62 when machine 1 is operating.

As an agency for controlling the rate of change of the potential of the control member 43 of electric valve means 37 or to delay the change of potential to stabilize the operation of the controlling system and to prevent hunting of the motor 1, I provide an anti-hunting circuit. The anti-hunting circuit may be connected to be responsive to a change in the energization of the motor 1 and may be connected to be responsive to the rate of change of the armature voltage of this machine. A transformer 63 may be connected across the armature 2 to introduce a stabilizing voltage into circuit 28. An impedance element 64 is connected in series relation with the output of circuit 54 and may be energized from the transformer 63. An adjustable resistance 65 is connected in series relation with the impedance element 64 to control the magnitude of the transient current introduced into circuit 28. The operation of the embodiment of my invention diagrammatically illustrated in Fig. 1 will be explained when the control system is operating to feed the electrode 30 to the work 29 and when the system is responding to maintain the arc length, and hence the arc voltage, at a predetermined value. The switch 5, of course, is moved to the closed circuit position to impress across anodes 8 and cathodes 9 of electric valve means 6 and 7 alternating voltages through the armature 2 of the dynamo-electric machine 1. Since the electric valve means 6 and 7 are reversely connected in parallel, these electric valves conduct current in opposite directions through the armature member 2 of machine 1. The excitation circuits 14 and 15 are arranged so that when the saturable inductive devices 20 are unsaturated, the voltages impressed on the control members 10 of electric valves 6 and 7 are substantially 180 electrical degrees out of phase with respect to the voltages impressed across the associated anodes 8 and cathodes 9. As is well understood by those skilled in the art, the electric valves 6 and 7 are rendered conductive when the potential impressed on the control members 10 exceeds a predetermined critical value and that the electric valves continue to conduct current for the remaining portion of the positive half cycle and for a predetermined length of time thereafter, depending upon the power factor of the load circuit. In the illustrated embodiment of my invention, the conducting period for electric valves 6 and 7 may be less than one-half cycle due to the counter-electromotive force of the motor 2. When there is substantial phase opposition between the voltages impressed on the control members 10 and the voltages impressed on the anodes 8, the average current conducted by the electric valve means is substantially zero, and when there is phase coincidence between the voltages impressed on the control members and the anodes, the average current conducted by the electric valve is maximum. For intermittent phase relationships between these voltages, the current conducted by the electric valve assumes corresponding intermediate values. As the saturable inductive devices 20 are saturated by the direct current supplied to control windings 22, the phase of the alternating voltages impressed on control members 10 is advanced.

The tap 51 of the voltage divider is adjusted so that the potential impressed on control member 43 is slightly negative when the arc voltage is of a predetermined value. Of course, the potential impressed on control member 44 remains constant and is slightly negative. For a balanced condition, that is, when the arc voltage is of a predetermined value, the potentials impressed on control members 43 and 44 are equal and both slightly negative so that the currents conducted by the parallel paths are equal in value, supplying equal currents to control windings 22 of saturable inductive devices 20. The excitation circuits 14 and 15 are adjusted so that the motor 1 is at standstill when the arc voltage is at its predetermined value. To effect this control, electric valve means 6 and 7 each conduct current for a corresponding interval of time during each half cycle of applied voltage. Referring to the operating characteristics shown in Fig. 2, the curve A represents the alternating voltage of circuit 4 and may be employed to represent the alternating voltage impressed across anode 8 and cathode 9 of electric valve 7. Curves B represent the currents conducted by electric valve 6 and curves C represent the currents conducted by electric valve 7. Since the average value of the currents conducted by electric valves 6 and 7 are equal and since these currents are opposing the net value of the average current conducted through armature 2 of machine 1 is zero and the machine is maintained at standstill.

For the purpose of explaining the operation of the voltage sensitive circuit 28, let it be assumed that the voltage appearing between the conductors 31 and 32 is substantially 300 volts and that the value of the resistance 47 is 50,000 ohms. Furthermore, let it be assumed that under the balanced condition the potentials impressed on the control members 43 and 44 are minus 1.5 volts. In addition, let it be assumed that the electric valve 37 is designed so that under these conditions the currents in the conductors 45 and 46 are each one milliampere. Under this condition of operation, the drop across the terminals of resistance 47 will be 100 volts. If the arc length increases, effecting an increase in arc voltage, the voltage appearing across the terminals of resistance 58 will also increase, increasing in a negative direction the voltage impressed on control member 43. By the proper choice of an electric valve of the desired characteristics, this negative increase in voltage may be employed to render the associated discharge path completely nonconductive. By virtue of the temporary decrease in current through the resistance 47, the cathode 42 will become more negative in potential than that under the balanced condition to cause this electric discharge path to conduct an increased amount of current. The sum of the currents in the two discharge paths always remains at a substantially constant value, differing only by the small difference required to change the voltage across resistance 47 as the cathodes 41 and 42 change in potential, with respect to the fixed control member 44, to achieve a balanced condition. Under this particular condition, the voltage drop across the resistance 47 may be considered to be 98.5 volts and the current conducted by the discharge path associated with control member 44 may be considered as being 1.97 milliamperes. By virtue of the increase of current in conductor 46, inductive device 20 in excitation circuit 15 will be saturated to effect an advance in phase of the alternating voltage impressed on the control member 10 of electric valve 7, causing the machine 1 to rotate in a direction to decrease the arc length and to restore the arc voltage to the predetermined value. In addition, the phase of the alternating voltage impressed on control member 10 of valve 6 will be retarded in phase due to the decrease of the current in conductor 45. This condition of operation is represented by the surves of Fig. 2 where curve D represents the decreased current conducted by electric valve 6, and curve E represents the increased current conducted by electric valve 7. By virtue of this unbalanced condition, the dynamo-electric machine 1 is energized to move the electrode 30 in a direction to decrease the arc length.

When the arc length decreases, the voltage appearing across the terminals of resistance 58 will decrease correspondingly to increase in the positive direction the potential impressed on control member 43 so that the discharge path associated with control member 43 conducts an increased amount of current slightly greater than the sum of the currents during balanced condition, and the discharge path associated with control member 44 conducts substantially no current. As a result, the phase of the voltage impressed on control member 10 of electric valve 7 will be retarded to decrease the current conducted thereby, and the phase of the voltage impressed on control member 10 of electric valve 6 will be advanced to increase the current conducted thereby. The net current conducted by armature 2 of machine 1 under these conditions will be in a direction to move the electrode 30 away from the work 29 to increase the arc length and to restore the arc voltage to the predetermined value. Under this last mentioned condition, the current conducted by the discharge path associated with control member 43 may be 2.03 milliamperes, and the voltage drop across the resistance 47 will be 101.5 volts, the sum of the currents through the two paths remaining substantially constant and differing only by the small difference required to change the voltage across resistance 47 as the cathodes 41 and 42 change potential, with respect to the fixed control member 44, to achieve a balanced condition.

It is to be understood that the control system responds not only to control the direction of rotation of the dynamo-electric machine 1, but also responds to control the speed of the machine 1 during the adjusting operation by virtue of the control of the direction and magnitude of the resultant current conducted to the armature 2 by electric valves 6 and 7.

An important advantage of the system is the feature thereof which serves to protect the system in the event the voltage sensitive circuit becomes defective. For example, if the electric valve means 37 becomes inoperative, occasioned by accidental breakage of the envelope 38, the electric valves 6 and 7 automatically become non-conductive since the excitation circuits 14 and 15 are biased so that the voltages impressed on the control members are 180 electrical degrees out of phase with the respective anode voltages. This protective feature is accomplished by virtue of the fact that the excitation circuit voltages are 180 degrees out of phase when the saturable inductive devices 20 are unsaturated. As soon as the electric valve means 37 ceases to conduct current, the circuits including conductors 45 and 46 are immediately deenergized and the saturable inductive devices 20 are restored to the unsaturated condition.

The anti-hunting action of the circuit including transformer 63, impedance element 64 and resistance 65 may be explained by considering the system when the arc voltage tends to increase above the value to be maintained. As the arc voltage increases, the negative potential impressed on control member 43 of electric discharge device 37 by circuit 54 also increases, reducing the current in conductor 45 and increasing the current in conductor 46, effecting thereby a retardation in phase of the voltage impressed on control member 10 of electric valve 6 and an advancement in phase of the control voltage impressed on control member 10 of electric valve 7. Due to the difference in the average currents conducted by these electric valves, and since the current conducted by electric valve 7 predominates, the electrode 39 tends to move towards the work to effect a reduction in the arc voltage. However, the change in voltage appearing across armature 2 of machine 1 induces a transient voltage in the secondary winding of transformer 63 and causes a transient current to flow in the impedance element 64. Transformer 63 and impedance element 64 are connected with relation to circuit 28 so that the transient voltage appearing across the terminals of resistance 64 is in a direction tending to oppose the change in the negative unidirectional biasing potential produced by circuit 54 when the armature voltage at first increases above the predetermined value. In this manner, a time delay action is introduced into the circuit 28, thereby stabilizing the operation of the circuit and the associated mechanical system. Of course, the transient voltage is effective only temporarily and after the transient voltage subsides the full negative voltage produced by circuit 54 is effective to control electric discharge device 37. Conversely, when the arc voltage decreases the transformer 63 and the impedance element 64 introduce into circuit 28 a transient voltage which tends to prevent the change or delay the change for a predetermined time.

Fig. 3 diagrammatically illustrates another embodiment of my invention and shows only a portion of the circuit illustrated in Fig. 1, and corresponding elements have been assigned like reference numerals. Where the welding voltage is unidirectional I provide a circuit 54, which is responsive to the arc voltage irrespective of its polarity. Conductors 30' constitute a direct current circuit the polarity of which may be reversed. Circuit 54 may include a full wave rectifier comprising a pair of single electric valves 66 and 67 and a voltage divider, including resistances 68 and 69. The output voltage of the circuit 54 is impressed on control member 43 of electric discharge device 37 through a suitable impedance element such as a resistance 70. I provide a circuit 71 which is responsive to the change in the energization of the motor 1, or responsive to the direction of change in the energization of motor 1, and may be connected across the armature 2 of this machine. Circuit 71 comprises a pair of electric circuits which are energized from secondary winding 72 of transformer 63. Each of the circuits includes a polarity selective means, such as a unidirectional conducting device 73, so that the circuits are selectively responsive to the polarity of the voltage change across armature 2. In order to provide different time delay or anti-hunting action for the different directions of change in the energization of armature 2, I employ current controlling means such as adjustable resistances 74 which are connected in series relation with the unidirectional conducting devices 63. An impedance element 75 having terminal connections 76 and 77 and an electrical intermediate connection 78 is connected to be energized by the pair of electric circuits in circuit 71 which transmits unidirectional current thereto. The left-hand circuit of the pair of circuits introduces a positive unidirectional voltage into the circuit for control member 43 of electric discharge device 37 and the right-hand circuit impresses a negative unidirectional potential on control member 43. The voltages so impressed on control member 43 by the impedance element 75, of course, occur only during those intervals in which there is a change in voltage across armature 2 of motor 1.

It is to be understood that, if desired, a pair of individual anti-hunting circuits 71 and the impedance elements 75 may be connected directly to the main or power electric valves 6 and 7 so that anti-hunting voltages are impressed directly upon the control members 10 of these valves.

The embodiment of my invention shown in Fig. 3 operates in substantially the same way as that of Fig. 1. The system responds to maintain the arc voltage at a substantially constant value and an anti-hunting action is effected by operation of circuit 71. The impedance element 75 introduces a voltage in the circuit for control member 43, tending to delay a change in potential of that member as the arc voltage varies and thereby stabilizes the operation of the system. By the proper adjustment of the resistances 74 in circuit 71, the time delay for different directions of change in the energization of armature 2 may be obtained. For example, in electric welding systems, it is desirable to move the electrode away from the work at a greater rate than the rate at which the electrode is moved toward the work. Furthermore, I have found that for very short arc lengths, that is, where the electrode is too close to the work, it is desirable to initiate the movement of the electrode away from the work practically instantaneously with the occurrence of the short arc length. In addition, it is desirable to prevent hunting of the electrode so that the arc length is not extended beyond that value at which the arc may be maintained for the particular voltage applied. In other words, it is not only desired to move the electrode away from the work at a relatively high rate of speed but it is also important to control the movement of the electrode near the end of its travel in the upward direction so that there is no overshooting. To effect this difference in speeds and rates of change of speed for the relative directions of movement of the electrode, the resistance 74 in one of the pairs of circuits in circuit 71 may be adjusted to have a substantially smaller value than the other resistance. In this manner, when the arc voltage is decreased below the predetermined value to be maintained, the system responds in a short interval of time to raise the electrode, whereas when the arc increases to a value above the predetermined value, a greater time delay is introduced so that the movement of the electrode toward the work occurs only after this delay and the electrode moves upward at a slower rate.

The voltage responsive circuit 54 shown in Fig. 3 operates to control the system in response to arc voltage irrespective of the polarity of the electrode 30 relative to that of the work 29. Where it is desirable to use direct current for welding purposes, it is important to provide voltage sensitive circuits which operate properly irrespective of the relative polarities of the electrode and the work. Circuit 54 controls the conductivity of the electric valve 37 under both conditions without necessitating changes in circuit connections, the electric valves 66 and 67 being arranged to transmit variable unidirectional currents to the resistance 78 irrespective of the polarity of the electrode 30.

In Fig. 4 there is diagrammatically illustrated a still further embodiment of my invention in which the circuit arrangement is essentially the same as that shown in Fig. 1 and corresponding elements have been assigned like reference numerals. In order to provide individual means associated with the electric valves 6 and 7 for preventing hunting of the system, I provide suitable individual current responsive means, such as current transformers 79 and 80, which are associated with electric valves 6 and 7, respectively. Secondary windings 81 of these transformers are connected to resistances 82 and 83, which are connected in series relation with the control members 10 of electric valves 6 and 7, and introduce into the control or excitation circuits for these valves potentials which tend to delay the rate of change of the control member potential upon a change in the current conducted by the respective electric valves. Suitable current controlling means, such as adjustable resistances 84, may be connected in series relation with the secondary windings 81 of transformers 79 and 80 to control the magnitude of the current transmitted to resistances 82 and 83, and hence control the magnitude of the damping potentials which appear across the terminals of these resistances. Capacitances 85 may also be connected across the variable resistance elements 84 to act as additional damping means.

The voltage responsive circuit 54 in the arrangement of Fig. 4 includes a voltage divider 86, which may be of the adjustable type, which is connected to be responsive to the arc voltage. A current limiting impedance, such as a resistance 87, may be connected in series relation with the voltage divider 86.

The system represented in Fig. 4 operates substantially as that explained above in connection with Fig. 1. The anti-hunting circuits including the transformers 79 and 80 respond to introduce transient voltages into the control circuits for electric valves 6 and 7 to delay the change of potentials of these control members. Due to the fact that these circuits are independent, the anti-hunting action or the time delay action for the individual valves may be different due to the particular adjustments of the resistances 84.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a dynamo-electric machine, a pair of reversely connected electric valve means for supplying current to said machine from said circuit and including control members, a pair of electric circuits for energizing said control members, electric discharge means including a pair of discharge paths each associated with a different one of said pair of circuits and each including a grid for controlling the currents in said pair of circuits, means for impressing on the grids relatively variable potentials to control the currents in said pair of circuits in accordance with a predetermined controlling influence, and means responsive to the rate of change of an electrical characteristic of said machine for controlling the rate of change of the potential of one of the grids.

2. In combination, an alternating current circuit, a dynamo-electric machine having an armature winding, a pair of reversely connected electric valve means for transmitting current to said armature winding, said electric valve means having control members for controlling the conductivities thereof, a pair of electric circuits for energizing said control members, electric discharge means having a pair of discharge paths each associated with a different one of said pair of circuits and each having a grid for controlling the conductivity thereof, means for impressing on one of the grids a substantially constant potential, means for impressing on the other grid a potential which varies in accordance with a predetermined controlling influence, and means responsive to the rate of change of voltage across said armature winding for controlling the rate of change of said second mentioned potential.

3. In combination, an alternating current circuit, a dynamo-electric machine, a pair of reversely connected electric valve means for supplying current to said machine to control the speed and direction of rotation thereof, said electric valve means including control members, a pair of electric circuits for energizing said control members, electric discharge means including a pair of discharge paths each associated with a different one of said pairs of circuits and each including a grid for controlling the currents in said pair of circuits, means for impressing on the grids relatively variable potentials to control the currents in said pair of circuits in accordance with a predetermined controlling influence, and means responsive to a change in the energization of said machine for delaying a change of the potential of one of the grids.

4. In combination, a source of current, a dynamo-electric machine, electric translating apparatus for energizing said machine from said source and comprising an electric valve means having a control member, means for energizing said control member to control an electrical characteristic of said machine in accordance with a predetermined controlling influence, and means for controlling the energization of said control member to vary the energization of said machine at different rates for different directions of change of said electrical characteristic.

5. In combination, a source of current, a dynamo-electric machine, electric valve means for energizing said machine from said source and having a control member, means for energizing said control member to control an electrical characteristic of said machine in accordance with a predetermined controlling influence and comprising an electric discharge device having a control member, and means for changing the potential of said second mentioned control member at different rates for different directions of change of said electrical characteristic.

6. In combination, a source of current, a dynamo-electric machine, electric valve means for energizing said machine from said source to control the speed and direction of rotation of said machine, said electric valve means having a control member for controlling the conductivity thereof, means for energizing said control member in accordance with a predetermined controlling influence and comprising an electric discharge device having a control member, and means for changing the potential of said second mentioned control member at different rates for different directions of speed change of said machine.

7. In combination, a source of current, a dynamo-electric machine including a winding, electric valve means for energizing said winding from said source and having a control member, an excitation circuit for energizing said control member and comprising an electric discharge device having a control member and means for impressing on said second mentioned control member a voltage which varies in accordance with a predetermined controlling influence to control an electrical characteristic of said machine, and means for introducing into said excitation circuit a voltage for changing the potential of said second mentioned control member at different rates for different directions of change of said electrical characteristic comprising means responsive to the direction of energization of said machine and a pair of electric circuits responsive to the polarity of the voltage appearing across said winding.

8. In combination, an alternating current circuit, a dynamo-electric machine including an armature winding, electric valve means for energizing said winding from said source and having a control member, an excitation circuit for energizing said control member and comprising an electric discharge device having a control member, means for impressing on said second mentioned control member a potential which varies in accordance with a predetermined controlling influence to control the speed of said machine and an impedance element for controlling the rate of change of the potential of said second mentioned control member, and means comprising a pair of electric circuits each including a unidirectional conducting device for selectively energizing said impedance element in accordance with the polarity of the armature voltage.

9. In combination, an alternating current supply circuit, a dynamo-electric machine, a pair of reversely connected electric valve means for transmitting current to said machine from said circuit, each of said electric valve means having a control member for controlling the conductivity thereof, a pair of excitation circuits each associated with a different one of said electric valve means for energizing the associated control member, and individual means connected in series relation with each of said electric valve means for delaying a change in potential of the associated control member.

10. In combination, an alternating current supply circuit, a dynamo-electric machine, a pair of reversely connected electric valve means for transmitting current to said machine from said circuit, each of said electric valve means having a control member for controlling the conductivity thereof, a pair of excitation circuits each associated with a different one of said electric valve means for energizing the associated control member, means for energizing said excitation circuits to control an electrical characteristic of said machine in accordance with a predetermined controlling influence, and individual means connected in series relation with each of the electric valve means to control the rate of change of potential of the associated control member.

11. In combination, an alternating current supply circuit, a direct current motor having an armature winding, a pair of reversely connected electric valve means for transmitting current to said armature winding from said supply circuit to control the speed and direction of rotation of said motor, each of said electric valve means having a control member for controlling the conductivity thereof, a pair of excitation circuits each associated with a different one of said electric valve means for energizing the associated control member and comprising means for impressing thereon an alternating voltage variable in phase in accordance with a predetermined controlling influence, and individual means connected in series relation with each of said electric valve means for introducing into said excitation circuits voltages to control the rate of change of the potential of the associated control member during changes of said controlling influence.

12. In combination, a dynamo-electric machine, a source of current, electric valve translating apparatus for energizing said machine from said source to control an electrical characteristic of said machine, a control circuit for said translating apparatus comprising an electric discharge device having a control electrode, a direct current circuit, the polarity of which may be reversed, and means for impressing on said control electrode a voltage of uniform polarity but of variable magnitude and comprising a voltage divider connected across said direct current circuit and a full wave rectifier connected to be energized from said direct current circuit through said voltage divider for impressing on said control electrode a unidirectional voltage which varies in accordance with an electrical condition of said direct current circuit.

13. In combination, a dynamo-electric machine, an alternating current circuit, electric translating apparatus connected between said machine and said circuit and comprising a pair of oppositely connected electric valve means for controlling the speed and direction of rotation of said machine, said electric valve means each having a control member for controlling the conductivity thereof, excitation circuits for impressing on said control members alternating voltages variable in phase, a circuit for controlling said excitation circuits comprising an electrical discharge device having a control electrode, a direct current circuit the polarity of which may be reversed, and means for controlling the energization of said control electrode to control the speed and the direction of rotation of said machine irrespective of the polarity of said direct current circuit and comprising a voltage divider connected across said direct current circuit and a full wave rectifier connected to be energized from said direct current circuit through said voltage divider for impressing on said control electrode a unidirectional voltage which varies in accordance with the voltage of said direct current circuit.

14. In combination, a motor of the direct current type, an alternating current circuit, electric translating apparatus connected between said motor and said circuit and comprising a pair of oppositely connected electric valve means for controlling the speed and direction of rotation of said motor, said electric valve means each having a control member for controlling the conductivity thereof, excitation circuits for impressing on said control members alternating voltages variable in phase, a pair of control circuits each associated with a different one of said excitation circuits for controlling the phase of said alternating voltages, an electrical discharge device comprising a pair of discharge paths each associated with a different one of said pair of circuits and each comprising a control electrode for controlling the conductivity of the associated discharge path, a direct current circuit the polarity of which may be reversed, and means for controlling the energization of said control electrodes to control the speed and direction of rotation of said motor irrespective of the polarity of said direct current circuit and comprising a voltage divider connected across said direct current circuit and a full wave rectifier connected to be energized from said direct current circuit through said voltage divider for impressing on one of said control electrodes a unidirectional voltage which varies in accordance with the voltage of said direct current circuit.

15. In combination, a source of current, a load circuit, electric translating apparatus for energizing said load circuit from said source and comprising an electric valve means having a control member, means for energizing said control member to control an electrical condition of said load circuit in accordance with a predetermined controlling influence, and means for controlling the energization of said control member to vary the energization of said load circuit at different rates for different directions of change of said controlling influence.

16. In combination, a source of current, a load circuit, electric valve translating apparatus for energizing said load circuit from said source, a control circuit for said translating apparatus comprising an electrical discharge device having a control electrode, a direct current circuit the polarity of which may be reversed, and means for controlling the energization of said control electrode to control an electrical condition of said load circuit irrespective of the polarity of said direct current circuit and comprising a voltage divider connected across said direct current circuit and a full wave rectifier connected to be energized from said direct current circuit through said voltage divider for impressing on said control electrode a voltage which varies in accordance with the voltage of said direct current circuit.

17. In combination, an electric discharge device having a control electrode, a direct current circuit the polarity of which may be reversed, and a circuit comprising a voltage divider connected across said direct current circuit and a full wave rectifier connected to be energized from said direct current circuit through said voltage divider for impressing on said control member a unidirectional voltage of fixed polarity irrespective of the polarity of said direct current circuit and which varies in magnitude in accordance with the voltage of said direct current circuit.

18. In combination, an electronic discharge device having a control electrode, a direct current circuit the polarity of which may be reversed, and a control circuit for energizing said control member comprising an impedance element, a voltage divider having terminal connections connected to said direct current circuit and having an intermediate connection and a full wave rectifier connected between said terminal connections and said intermediate connection for transmitting variable amounts of unidirectional current to said impedance element to impress on said control electrode a unidirectional potential which varies in accordance with the magnitude of the voltage of said direct current circuit irrespective of its polarity.

JASPER E. ANDERSON.